United States Patent [19]
Langley et al.

[11] 3,884,713
[45] May 20, 1975

[54] PIGMENT DISPERSIONS

[75] Inventors: Robert Langley, Newton Mearns; George Heddle Robertson, Paisley; Christopher James Bridge, Dalry, all of Scotland

[73] Assignee: Ciba-Geigy Corporation, Ardsley, N.Y.

[22] Filed: Oct. 5, 1973

[21] Appl. No.: 403,740

[30] Foreign Application Priority Data
Oct. 11, 1972 United Kingdom............ 46746/72

[52] U.S. Cl.......................... 106/308 N; 106/288 Q
[51] Int. Cl............................................. C09c 3/02
[58] Field of Search..................... 106/308 N, 288 Q

[56] References Cited
UNITED STATES PATENTS
3,560,235  2/1971  Sarfas et al. ..................... 106/308 N
3,728,301  4/1973  Spence et al. .................. 106/308 N Primary Examiner—Winston A. Douglas
Assistant Examiner—J. V. Howard
Attorney, Agent, or Firm—Vincent J. Cavalieri

[57] ABSTRACT

A flocculation-resistant dispersion of a solid in a liquid comprising a particulate solid material, an organic solvent and, as stabiliser, a material which contains groups soluble in the organic solvent, which contains more than one urethane group and which contains no significant proportion of basic amino groups.

The pigment dispersions are especially useful for the coloration of gravure inks.

10 Claims, No Drawings

PIGMENT DISPERSIONS

The present invention relates to new dispersions of solids in liquids, and in particular to new pigment dispersions having improved stability and handling properties.

Pigments, by virtue of their high strength, brilliant shades and fastness properties, are of great commercial significance in a wide range of applications.

However, while their fastness properties are generally excellent, pigments when stored as dispersions in non-aqueous solvents for use in paint and link systems, suffer from a particular defect. The defect in question is the tendency of the pigment particles to flocculate, whereupon the dispersion becomes difficult to handle. Many attempts have been made to overcome this flocculation problem and these attempts have met with varying degrees of success. For instance, British Pat. No. 949,739 describes the use of flocculation-inhibiting phthalocyanine derivatives of the formula:

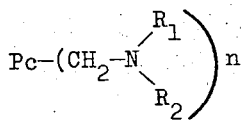

wherein Pc represents a phthalocyanine radical, $R_1$ is hydrogen or an aliphatic residue, $R_2$ is an aliphatic residue, or $R_1$ and $R_2$ together with the nitrogen atom to which they are bound form a heterocyclic residue and n is 1, 2, 3 or 4. These phthalocyanine derivatives are however themselves coloured, and this factor limits their use to the cases wherein the added and treated pigments are of similar shade.

More recently, German Pat. Specification No. 2,041,033 describes certain colourless polyurea stabilisers for pigment dispersions, and these stabilisers are of course inherently more suitable for general application.

We have now discovered a further group of colourless materials eminently suitable for use as stabilisers which reduce flocculation of dispersions of solids in liquids and particularly pigment dispersions.

According to the present invention, there is provided a flocculation-resistant dispersion of a solid in a liquid comprising a particulate solid material, an organic solvent and, as stabiliser, a material which contains groups soluble in the organic solvent, which contains more than one urethane group and which contains no significant proportion of basic amino groups.

The present invention also provides a dry flocculation-resistant composition comprising a particulate solid material and, as stabiliser, a material which contains more than one urethane group and which contains no significant proportion of basic amino groups.

The particulate solid material may be any finely-divided solid which is substantially insoluble in the organic solvent. For instance the solid may be a pigment or a dyestuff.

Pigments are of particular interest however, and those which may be used in the compositions of the present invention include organic pigments for instance azo and azomethine pigments, metal phthalocyanines, optionally halogen-substituted, polycyclic pigments such as quinacridones, dioxazines, vat dyestuffs, anthraquinones and isoindolinones, and salts of basic pigments precipitated with the heteropoly acids of phosphorus, tungsten and molybdenum. Inorganic pigments may also be used such as titanium dioxide and red and yellow iron oxides. Carbon black may also be used.

The organic solvent used may be any liquid the physical properties, in particular viscosity and boiling-point properties, of which render it suitable for use as a dispersion medium for solids. Of particular interest however, are solvents such as aliphatic hydrocarbons which are compatible with gravure ink systems and paint systems. Mixtures of solvents can be used and the solvent or solvent mixture may be used in conjunction with binders such as urea — or melamine/formaldehyde resins or zinc/calcium resinates conventionally used in such ink and paint systems.

The urethane stabilisers used are condensation products containing more than one urethane group derived from the reaction of a compound containing one or more isocyanate groups and a compound or compounds containing one or more hydroxyl groups.

The urethane stabilisers preferably have the formula

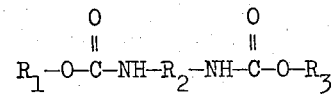

wherein $R_1$ and $R_3$ are derived from monohydroxyl compounds or

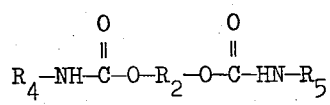

wherein $R_4$ and $R_5$ are derived from monoisocyanate compounds, and wherein $R_2$ is an organic bridging residue.

$R_1$, $R_3$, $R_4$ and $R_5$ are the same or different and each is, for instance, an alkyl or cyclo alkyl residue having from 1 to 22 carbon atoms, an aralkyl residue from 7 to 40 carbon atoms or an aryl residue having from 6 to 20 carbon atoms.

$R_2$ may be, for instance, an alkylene residue having 1 to 20 carbon atoms, such as methylene, trimethylene or hexamethylene; an arylene residue having from 6 to 40 carbon atoms such as phenylene or triphenylene or an aralkylene residue having from 7 to 40 carbon atoms.

$R_2$ may also be a poly-functional radical containing, for instance, urethane, ether, ester, urea, amide or hydantoin groups and may also contain alkyl, cycloalkyl, aralkyl or alkyl groups.

The groups in the urethane stabiliser which have solubility in the organic solvent used to produce the dispersions of the invention, may be any oleophilic groupings but are preferably saturated or unsaturated aliphatic groups having from 6 to 22, preferably 8 to 20 carbon atoms or aralkyl residues having at least one alkyl chain containing from 1 to 24, preferably 1 to 20 carbon atoms. Examples of saturated aliphatic groups are n-hexyl, n-octyl, n-decyl, n-dodecyl, n-octadecyl, n-eicosyl and n-behenyl groups, suitable unsaturated aliphatic radicals include n-hexenyl, n-decenyl, tetradecenyl, hexadecenyl and oleyl groups, and examples of aralkyl substituents are p-octylphenyl, p-nonylphenyl and p-dodecylphenyl groups.

As mentioned earlier, the urethane stabilisers are produced by the reaction of an isocyanate with a hydroxy compound.

Suitable examples of isocyanate starting-materials include both aliphatic and aromatic polyisocyanates such as tris(4-isocyanatophenyl) methane but toluene-2,4-diisocyanate, optionally containing a proportion of the 2,6-isomer, is particularly preferred.

Examples of hydroxy compound starting-materials include phenols, alcohols and carboxylic acids.

Specific examples of phenols include phenol itself, alkylated or alkenylated phenols containing one or more alkyl or alkenyl groups each having from 1 to 20 carbon atoms such as o-, m- and p- cresols, xylenols and mono- and di-nonyl phenols; aralkyl phenols such as 4-($\alpha,\alpha$-dimethyl benzyl) phenol; and aryl phenols such as 4-hydroxydiphenyl as well as $\alpha$- and $\beta$-naphthol.

As examples of alcohol starting-materials of particular interest there may be mentioned saturated or unsaturated aliphatic alcohols having at least 4 carbon atoms, such as n-butanol, n-octanol, n-decanol, n-tetradecanol, n-octadecanol, myristyl, cetyl and oleyl alcohol. Optionally the aliphatic residue may be interrupted by one or more oxygen atoms or may contain further substituents for instance aryl residues, such as phenyl residues or contain functional groupings such as ester, amide or urea groupings.

Suitable examples of carboxylic acid starting-materials include mono- and di- basic acids and acids of higher basicity. Of particular interest however are dicarboxylic acids of the formula $(X)_n(COOH)_2$ wherein X may be methylene or phenylene and $n$ is an integer from 0 to 8.

Preferred urethane stabilisers are those produced by reacting a polyisocyanate such as 2,4-tolylene-diisocyanate, with the hydroxy compound. Ideally the reaction is effected in the same organic solvent used to prepare the final pigment dispersion, thereby obviating the need to isolate the urethane from its reaction mixture.

The urethane stabilisers produced by reacting together a poly-isocyanate and hydroxy compounds are complex mixtures of products. Typical reactant mixtures include 2,4-tolylene diisocyanate/p-C7–C18 alkyl phenols, 2,4-tolylene diisocyanate/p-C7–C18 alkyl phenols/ethylene glycol, 2,4-tolylene diisocyanate/ a mixture of isomeric m-C15-alkadienyl phenols/glycerol mono-oleate and 2,4-tolylene diisocyanate/oleyl alcohol/neopentyl glycol.

Pigment dispersions according to the invention may be prepared by any convenient method although the following techniques are of special interest:

a. Ball-milling a mixture of pigment, organic solvent and stabiliser for an extended period.

b. Adding the stabliser during the treatment of the pigment with one solvent, removing this solvent and then dispersing the pigment/stabiliser mixture in further solvent.

c. Flushing the pigment from aqueous press-cake into solvent and then adding the stabiliser at this stage.

d. Incorporation of the stabiliser during salt-milling of the pigment, for instance a crude phthalocyanine pigment, into pigmentary form and subsequently dispersing the product in solvent.

e. In-situ preparation of the stabiliser from its starting-materials during the treatment of pigment as in any of steps (a), (b), (c) or (d).

The relative proportions of the components of the dispersions according to the invention are advantageously chosen so that the amount of the urethane stabiliser is within the range of from 5 to 200% by weight based on the particulate solid in the dispersion. Desirably the dispersions contain from 10 to 60% by weight of particulate solids based on the total weight of the dispersion.

The urethane may be used either alone as sole stabiliser or in conjunction with other materials known to be effective stabilisers for dispersions of solids in liquids.

The pigment dispersions according to this invention have excellent strength and flow properties when used in surface-coating applications, such as paints lacquers and inks, particularly in gravure ink systems. In addition to their excellent performance in application, the dispersions are advantageous in that they are conveniently handled and easily metered, since they are in the form of a highly concentrated pumpable liquid.

Some examples will now be given; parts and percentages are by weight unless otherwise stated.

EXAMPLE 1

A. 1 mole of 2,4-tolylene-diisocyanate and 2 moles of p-heptyl phenol were dissolved in toluene and the solution was heated to 100°C and held for 2 hours at this temperature. The toluene solvent was then removed, leaving a plastic mass having the composition:

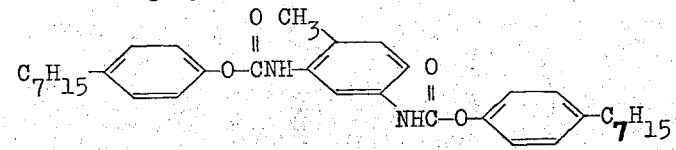

B. (a) 100 parts of C.I. Pigment Red 57

(b) 30 parts of the urethane stabiliser produced in Part A of this example, and (c) 300 parts of an aliphatic hydrocarbon solvent having a distillation range of 90°–105°C.

were ball milled for 16 hours in a 1 lb. honey jar. A stable, well deflocculated dispersion was obtained. A rotogravure ink prepared from this dispersion had improved gloss, strength and flow properties when compared with an ink from a dispersion from which the polyurethane component had been omitted.

EXAMPLE 2

1 Mole of 2,4-tolylene diisocyanate and 2 moles of oleyl alcohol were reacted together in the manner described in Example 1 (A).

The urethane stabiliser so produced was then used to form a dispersion of C.I. Pigment Red 57 in an aliphatic hydrocarbon solvent as described in Example 1 (B).

EXAMPLE 3

2 Moles of 2,4-tolylene diisocyanate, 1 mole of hexan-1,6-diol and 2 moles of dodecyl phenol were refluxed in acetone for 4 hours. The solvent was then removed by distillation.

The urethane stabiliser so produced was then used to form a dispersion of C.I. Pigment Red 57 in an aliphatic hydrocarbon solvent in the manner described in Example 1 (B).

EXAMPLE 4

2 Moles of 2,4-tolylene diisocyanate, 1 mole of ethylene glycol and 2 moles of oleyl alcohol were reacted together according to the procedure described in Example 3.

The urethane stabiliser so obtained was then dispersed in solvent as described in Example 1 (B) but using white spirit as the solvent.

EXAMPLES 5 TO 16

A. 2 moles of 2,4-tolylene diisocyanate, 1 mole glycerol mono-oleate and 2 moles of a mixture of isomeric meta-$C_{15}$-alkadienyl substituted phenol were reacted using the procedure described in Example 3.

B. A mixture of 10.0 parts by weight of the urethane stabiliser obtained in Example 5 (A), 20 parts by weight of β- copper phthalocyanine (C.I. Pigment Blue 15.3) and 70.0 parts by weight of an 80:20 mixture of aliphatic hydrocarbon solvent having a distillation range of 90° to 105°C and toluene was ball-milled for 22 hours and gave a fluid well-deflocculated dispersion.

This general procedure was repeated but varying the type and/or proportion of the reactants. The various combinations of reactants used are set out in the following table.

mented with titanium dioxide, to produce a high-strength paint.

EXAMPLE 18

50 parts by weight of β-form copper phthalocyanine pigment (C.I. Pigment Blue 15.3) were slurried in 500 parts by volume of acetone. 20 parts by weight of the urethane stabiliser described in Example 12 were added and the whole mixture was refluxed with agitation for 4 hours. 500 parts by weight of water were then added slowly, whilst the acetone was removed by azeotropic distillation. The resulting suspension was filtered, and the filter-cake was dried at 60°C, giving a dry, intimate mixture of copper phthalocyanine and urethane stabiliser.

10 parts by weight of this mixture were dispersed in 52.5 parts by weight of a 40:60 weight/weight mixture of toluene and an aliphatic hydrocarbon solvent having a distillation range of 90° to 105°C. The fluid dispersion so formed was suitable for the colouration of rotogravure inks.

EXAMPLE 19

The procedure of Example 18 was repeated except that instead of using the pre-formed urethane stabiliser of Example 12, the starting-materials for the stabiliser were added to the reaction mixture, so that the urethane was formed in situ.

| Example | Number of moles of 2,4-tolylene diisocyanate | Number of moles and type of phenol | Number of moles and type of alcohol | Number of moles and type of polyol |
|---|---|---|---|---|
| 6 | 1 | 2 × p-$C_8H_{17}$ alkyl phenol | none | none |
| 7 | 1 | 2 × p-$C_9H_{19}$ alkyl phenol | none | none |
| 8 | 1 | 2 × substituted phenol of Example 5 (A) | none | none |
| 9 | 1 | 2 × p-$C_{12}H_{25}$ alkyl phenol | none | none |
| 10 | 1 | 2 × $C_{18.5}H_{38}$ alkyl phenol (average) | none | none |
| 11 | 2 | 2 × substituted phenol of Example 5 (A) | none | 1 × hexan-1,6-diol |
| 12 | 2 | 2 × substituted phenol of Example 5 (A) | none | 1 × ethylene glycol |
| 13 | 3 | 2 × substituted phenol of Example 5 (A) | none | 2 × glycerol mono-oleate |
| 14 | 3 | 3 × substituted phenol of Example 5 (A) | none | 1 × glycerol |
| 15 | 2 | none | 2 × oleyl alcohol | 1 × neopentyl glycol |
| 16 | 2 | 1 × substituted phenol of Example 5 (A) | 1 × oleyl alcohol | 1 × ethylene glycol |

EXAMPLE 17

167 parts by weight of α-form partially chlorinated copper phthalocyanine (C.I. Pigment Blue 15.1), in the form of press-cake containing 50 parts by weight of dry pigment, 15 parts by weight of the urethane stabiliser produced according to Example 4 and 50 parts by volume of white spirit were mixed in a heavy-duty internal mixer until the pigment dispersed in the white spirit leaving a colourless aqueous layer. The aqueous layer was then removed, and mixing was continued to give a fine dispersion of pigment in white spirit.

208 parts by volume of white spirit were added to the pigment dispersion, with mixing, and gave a fluid well-deflocculated pigment suspension. This suspension was suitable for mixing with a white paint, for instance a long oil alkyd resin dissolved in white spirit and pig-

EXAMPLE 20

50 parts by weight of β-form copper phthalocyanine pigment were slurried in 125 parts by weight of an aliphatic hydrocarbon solvent having a distillation range of 90°–105°C together with sufficient amounts of the starting materials for the urethane stabiliser of Example 13, to form 20 parts by weight of the urethane stabiliser. The whole mixture was stirred for 2 hours at room temperature and then refluxed for 4 hours to ensure formation of the urethane stabiliser. The mixture was then ball milled for 22 hours to produce a fluid well-deflocculated dispersion.

The above procedure was repeated but adding the starting-materials for the urethane stabiliser to the ball mill instead of to the initial reaction, whereby the urethane was formed during the pigment dispersion step.

EXAMPLE 21

Oleyl alcohol and a commercially available 75% solution of a polyfunctional aliphatic polyisocyanate containing 16 to 17% of NCO groups in a 1:1 weight/weight mixture of ethylene glycol acetate:xylene, were refluxed for 6 hours in acetone in respective proportions sufficient to provide 1:1 molar ratio of hydroxyl:isocyanate groups. The solvents were then removed.

3 parts by weight of the urethane stabiliser so produced, 30 parts by weight of pigment (C.I. Pigment Yellow 12) and 67 parts by weight of an aliphatic hydrocarbon solvent having a distillation range of 90° to 105°C were ball milled together to produce a fluid suspension suitable for colouring rotogravure inks.

EXAMPLE 22

The procedure of Example 21 was repeated except that the isocyanate starting-material used was a commercially-available 75% solution of polyfunctional aromatic polyisocyanates containing 13% of NCO groups in ethyl acetate.

EXAMPLE 23

2 moles of hexamethylene diisocyanate, 1 mole of hexan-1,6-diol and 2 moles of oleyl alcohol were refluxed in acetone solution for 6 hours and the solvent was then removed.

3 parts by weight of the urethane so produced, 30 parts by weight of pigment (C.I. Pigment Yellow 12) and 67 parts by weight of an aliphatic hydrocarbon solvent having a distillation range of 90° to 105°C were ball milled to give a fluid dispersion.

EXAMPLE 24

2 moles of 2,4-tolylene diisocyanate, 1 mole of bisphenol A and 2 moles of the substituted phenol used in Example 5 (A) were refluxed in toluene solution for 4 hours and the solvent was then removed.

20 parts by weight of β-form copper phthalocyanine (C.I. Pigment Blue 15.3), 10 parts by weight of the urethane produced as above and 70 parts by weight of white spirit were ball milled to produce a fluid dispersion.

EXAMPLE 25

2 moles of 2,4-tolylene diisocyanate, 1 mole of ethylene glycol and 2 moles of p-octylphenol were refluxed in acetone solvent for 6 hours and the solvent was then removed.

15 parts by weight of copper phthalocyanine (C.I. Pigment Blue 15.3), 7.5 parts by weight of the urethane produced above and 77.5 parts by weight of toluene were ball milled to produce a fluid dispersion.

EXAMPLE 26

1 mole of oxalic acid was added slowly to 2 moles of 2,4-tolylene diisocyanate in refluxing acetone and the mixture was refluxed for a further 2 hours after the addition of oxalic acid was complete. 2 moles of oleyl alcohol were added and the mixture was refluxed for a further 2 hours. The solvent was then removed.

5 parts by weight of the urethane/amide so formed, 15 parts by weight of β-form copper phthalocyanine (C.I. Pigment Blue 15.3), 56 parts by weight of an aliphatic hydrocarbon solvent having a distillation range of 90° to 105°C and 24 parts by weight of toluene were ball milled to produce a fluid dispersion.

EXAMPLE 27

1 mole of 2,4-tolylene diisocyanate and 2 moles of p-α,α-dimethylbenzyl phenol were refluxed in acetone solution for 8 hours and the solvent was then removed.

7.5 parts by weight of the urethane so formed, 15 parts by weight of β-form copper phthalocyanine (C.I. Pigment Blue 15.3), 38.75 parts by weight of toluene and 38.75 parts by weight of an aliphatic hydrocarbon solvent having a distillation range of 90° to 105°C were milled to form a fluid dispersion.

EXAMPLE 28

1 mole of monoethanolamine, 2 moles of oleyl alcohol and 2 moles of 2,4-tolylene diisocyanate were refluxed in acetone solution for 6 hours and the solvent was then removed.

10 parts by weight of the urethane so produced, 25 parts by weight of pigment (C.I. Pigment Yellow 12), and 65 parts by weight of an aliphatic hydrocarbon solvent having a distillation range of 90° to 105°C were milled to produce a fluid dispersion.

EXAMPLE 29

A mixture consisting of:

| | |
|---|---|
| 25 | Parts by weight of C.I. Pigment Red 57 |
| 6.25 | Parts by weight of the stabiliser of Example 15 |
| 6.25 | Parts by weight of a phenolic modified rosin |
| 62.5 | Parts by weight of an 80:20 weight/weight mixture of an aliphatic hydrocarbon solvent having a distillation range of 90° to 105°C and toluene was ball-milled to give a fluid dispersion suitable for the colouration of gravure inks. |

EXAMPLE 30

A mixture consisting of:

| | |
|---|---|
| 18.6 | Parts by weight of ethylene glycol |
| 53.6 | Parts by weight of oleyl alcohol and |
| 35.5 | Parts by weight of methylethyl ketone was heated to reflux, and |
| 69.6 | Parts by weight of toluene-2,4-diisocyanate were added over a period of one hour, whilst maintaining reflux conditions. When all the isocyanate had been added, the mixture was heated under reflux conditions for a further 8 hours, then cooled and |
| 35.5 | Parts by weight of toluene were added. |

The product was was a 50% solids dispersion of a stabiliser according to the invention in a 1:1 toluene: methylethylketone mixture.

EXAMPLE 31

55 Parts by weight of an aliphatic hydrocarbon solvent having a distillation range of 90° to 105°C were added, with stirring, to 20 parts of the product of Example 30.

25 Parts by weight of a 95:5 weight/weight mixture of copper phthalocyamine and hydrogenated rosin (prepared by grinding crude copper phthalocyamine and the hydrogenated rosin in a ball-mill) were added over a period of one hour to the stirred stabiliser/solvent mixture, and the total mixture was then heated under reflux conditions for 6 hours, cooled and transferred to a ball-mill. After milling for 16 hours, a fluid dispersion was produced which was capable of providing high-strength gravure inks.

EXAMPLE 32

The product of Example 30 was fractionally distilled and gave a 66.7% solids dispersion in toluene and then reduced with an aliphatic hydrocarbon solvent having a distillation range of 90° to 105°C to give a 50% solids suspension in a 1:1 toluene: aliphatic hydrocarbon mixed solvent.

20 Parts by weight of this suspension, 5 parts by weight of n-propanol, 45 parts by weight of an aliphatic hydrocarbon solvent boiling in the range 90° to 105°C and 30 parts by weight of the copper phthalocyanine/-hydrogenated rosin ground mixture described in Example 31 were placed in a ball-mill and milled for 32 hours at 50°C to give a fluid dispersion suitable for the preparation of gravure inks of high colour strength.

EXAMPLE 33

| | |
|---|---|
| 25 | parts of carbon black pigment (C.I. Pigment Black 7) |
| 12.5 | parts of the urethane of Example 5A |
| 6 | parts of zinc/calcium resinate |
| 56.5 | parts of a 3:2 aliphatic hydrocarbon solvent having a distillation range of 90° to 105°C : toluene mixture, were ball milled for 16 hours to produce a fluid dispersion suitable for the colouration of gravure inks. |

EXAMPLE 34

| | |
|---|---|
| 34.8 | parts toluene-2,4-diisocyanate were added to a refluxing mixture of |
| 6.2 | parts ethylene glycol |
| 7.4 | parts n-butanol and |
| 26.8 | parts oleyl alcohol in |
| 75.2 | parts methylethylketone, over 0.5 hours. |

The mixture was refluxed for a further 12 hours and the methylethylketone was removed.

| | |
|---|---|
| 10 | parts of the dried product |
| 20 | parts of C.I. Pigment Red 166 (an azo condensation pigment) and |
| 70 | parts of white spirit were ball-milled to give a fluid dispersion suitable for reduction to a long oil alkyd, white spirit based paint. |

EXAMPLE 35

| | |
|---|---|
| 50 | parts of the rutile modification of titanium dioxide pigment (Tioxide R-CR2, C.I. Pigment White 6) |
| 15 | parts of the urethane of Example 34 and |
| 35 | parts of white spirit were ball milled for 24 hours to give a fluid dispersion. |

EXAMPLE 36

| | | |
|---|---|---|
| A. | 80.4 | parts oleyl alcohol |
| | 72.7 | parts cetyl alcohol |
| | 18.6 | parts ethylene glycol in |
| | 260 | parts methylethylketone were refluxed and |
| | 104.4 | parts toluene-2,4-diisocyanate added over 0.5 hours. |

The reflux was maintained for a further 12 hours and the solvent was removed.

| | | |
|---|---|---|
| B. | 25 | parts β-form copper phthalocyanine pigment (C.I. Pigment Blue 15.3) |
| | 12.5 | parts of the urethane of Example 36A and |
| | 62.5 | parts of an aliphatic hydrocarbon solvent having a distillation range of 90° to 105°C were ball milled for 24 hours to give a fluid dispersion |

What we claim is:

1. A flocculation-resistant dispersion of a solid in a liquid comprising a particulate solid material selected from the group consisting of a pigment or a dyestuff, an organic solvent suitable as a dispersion median for said particulate solid material and as a stabilizer a material which contains groups soluble in the organic solvent, which contains more than one urethane group and which contains no significant proportion of basic amino groups, wherein said stabilizer is within the range of from 5 to 200% by weight based on the particulate solid in the dispersion and said particulate solids is in the range of from 10 to 60% by weight based on the total weight of the dispersion.

2. A dispersion as claimed in claim 1 wherein the organic solvent is an aliphatic hydrocarbon compatible with gravure ink systems and paint systems.

3. A dispersion as claimed in claim 1 wherein the urethane stabilizer has the formula:

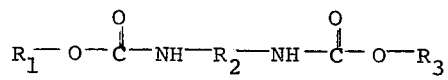

wherein $R_2$ is an organic bridging residue selected from the group consisting of an alkylene residue having from 2 to 20 carbon atoms, an arylene residue having from 6 to 40 carbon atoms or an aralkylene residue having from 7 to 40 carbon atoms and wherein $R_1$ and $R_3$ are derived from monohydroxyl compounds, or has the formula:

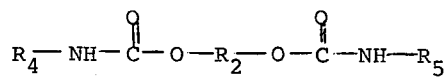

wherein $R_4$ and $R_5$ are derived from monoisocyanate compounds.

4. A dispersion as claimed in claim 3 wherein $R_1$, $R_3$, $R_4$ and $R_5$ are the same or different and each is an alkyl or cycloalkyl residue having from 2 to 22 carbon atoms, an aralkyl residue having from 7 to 40 carbon atoms or an aryl residue having from 6 to 20 carbon atoms, and wherein $R_2$ is an alkylene residue having from 2 to 20 carbon atoms, an arylene residue having from 6 to 40 carbon atoms or an aralkylene residue having from 7 to 40 carbon atoms.

5. A dispersion as claimed in claim 3 wherein $R_2$ is a polyfunctional radical containing urethane, ether, ester, urea, amide, hydantoin, alkyl, cycloalkyl, aralkyl, or alkyl groups.

6. A dispersion as claimed in claim 1 wherein the stabiliser is a complex mixture of products derived from the reaction of a polyisocyanate and a hydroxy compound.

7. A dispersion as claimed in claim 6 wherein the polyisocyanate is 2,4- tolylene diisocyanate.

8. A dispersion as claimed in claim 6 wherein the hydroxy compound is p- mixed C7–C18 alkyl phenols, ethylene glycol, p-C15 alkyl phenol, glycerol monooleate, oleyl alcohol or neopentyl glycol or mixtures thereof.

9. A dispersion as claimed in claim 1, wherein the urethane stabiliser is a urethane obtained by reaction of 4 moles of 2,4-tolylene diisocyanate, 3 mol of ethylene glycol and 2 moles of oleyl alcohol.

10. A dispersion as claimed in claim 1, wherein the urethane stabiliser is a urethane obatined by reaction of 2 moles of 2,4-tolylene diisocyanate, 1 mole glycerol mono-oleate and 2 moles of a mixture of isomeric meta-$C_{15}$-alkadienyl substituted phenol.

* * * * *